United States Patent
O'Day

[19]

[11] Patent Number: 6,029,999
[45] Date of Patent: Feb. 29, 2000

[54] ADJUSTABLE SPLASH GUARD ASSEMBLY

[76] Inventor: John M. O'Day, 2255 Emerald Dr., Castle Rock, Colo. 80104

[21] Appl. No.: 08/845,023

[22] Filed: Apr. 19, 1997

[51] Int. Cl.$^7$ .............................. B62B 9/16; B62D 25/18
[52] U.S. Cl. .......................................... 280/851; 280/154
[58] Field of Search ................................ 280/851, 154, 280/848, 847, 152.1, 152.3, 160.1; 248/222.11, 223.41, 297.31, 298.1

[56] References Cited

U.S. PATENT DOCUMENTS

| | | | |
|---|---|---|---|
| 614,503 | 11/1898 | Sackett | 280/152.3 |
| 1,226,323 | 5/1917 | Fialkowski | 280/152.3 |
| 2,519,771 | 8/1950 | Lacore | 155/165 |
| 3,135,489 | 6/1964 | Gledhill | 248/223 |
| 3,333,868 | 8/1967 | Sogoian | 280/851 |
| 3,473,825 | 10/1969 | Ochs | 280/851 |
| 3,672,622 | 6/1972 | Breslow | 248/223.41 |
| 3,675,943 | 7/1972 | Moore et al. | 280/851 |
| 3,711,119 | 1/1973 | Hollingsworth | 280/851 |
| 3,778,086 | 12/1973 | Moore et al. | 280/851 |
| 4,113,217 | 9/1978 | O'Connell | 248/222.11 |
| 4,319,763 | 3/1982 | White | 280/152.3 |
| 4,340,199 | 7/1982 | Brock | 248/544 |
| 4,557,455 | 12/1985 | Benjamin | 248/496 |
| 4,613,135 | 9/1986 | Rush | 473/488 |
| 4,695,070 | 9/1987 | Knox | 280/851 |
| 5,026,094 | 6/1991 | Haddox . | |
| 5,109,992 | 5/1992 | Miller | 211/59.1 |
| 5,121,944 | 6/1992 | Haddox . | |
| 5,129,613 | 7/1992 | Lloyd et al. | 248/222.11 |
| 5,240,213 | 8/1993 | Horcher | 248/223.41 |
| 5,460,412 | 10/1995 | Vincent et al. . | |
| 5,511,332 | 4/1996 | Sturkie et al. | 40/661.03 |
| 5,765,920 | 6/1998 | Lai | 297/411.36 |
| 5,816,550 | 10/1998 | Watanabe et al. | 248/222.11 |
| 5,816,617 | 10/1998 | Huang | 280/851 |

*Primary Examiner*—Lanna Mai
*Assistant Examiner*—Bridget Avery
*Attorney, Agent, or Firm*—Julie L. Bernard

[57] ABSTRACT

A splash guard assembly for preventing debris splash-back and vehicle damage is described. This assembly permits the tool free, vertical adjustment of a mud flap while attached to a vehicle. Further, the assembly prevents the build-up of debris between itself and the vehicle. The invention may be used, for example, with any vehicle capable of carrying a conventional mud flap, or may be customized to any other vehicle.

6 Claims, 9 Drawing Sheets

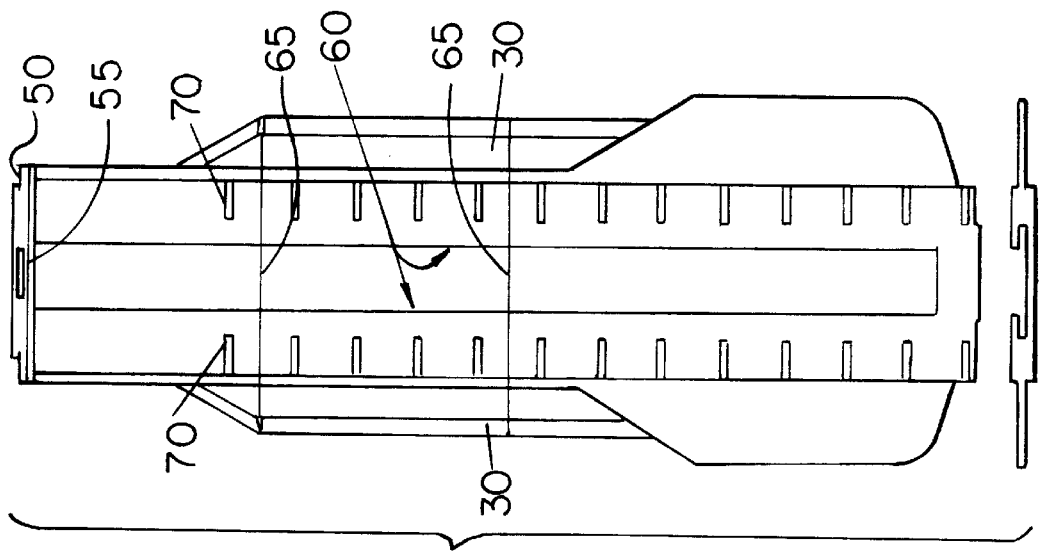
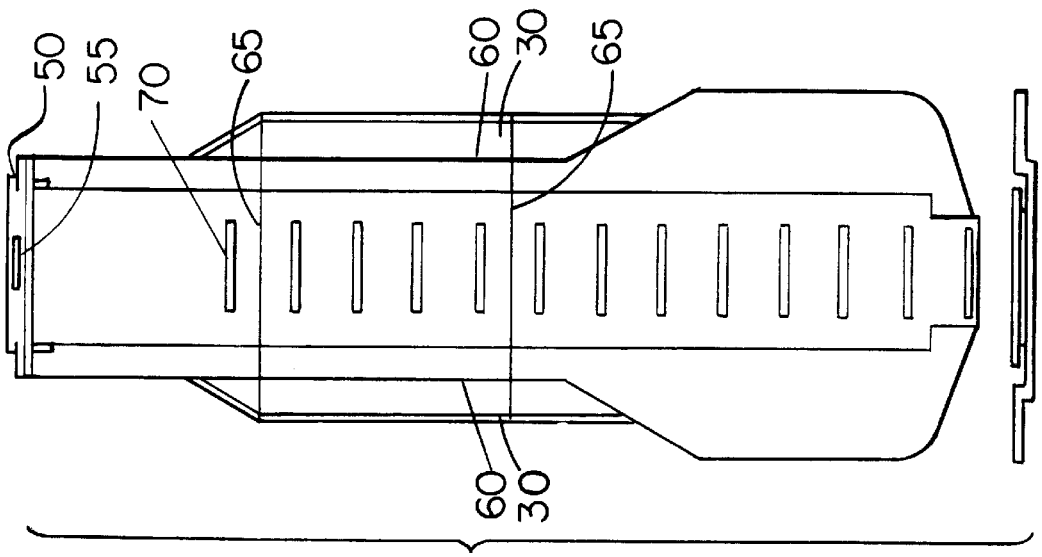

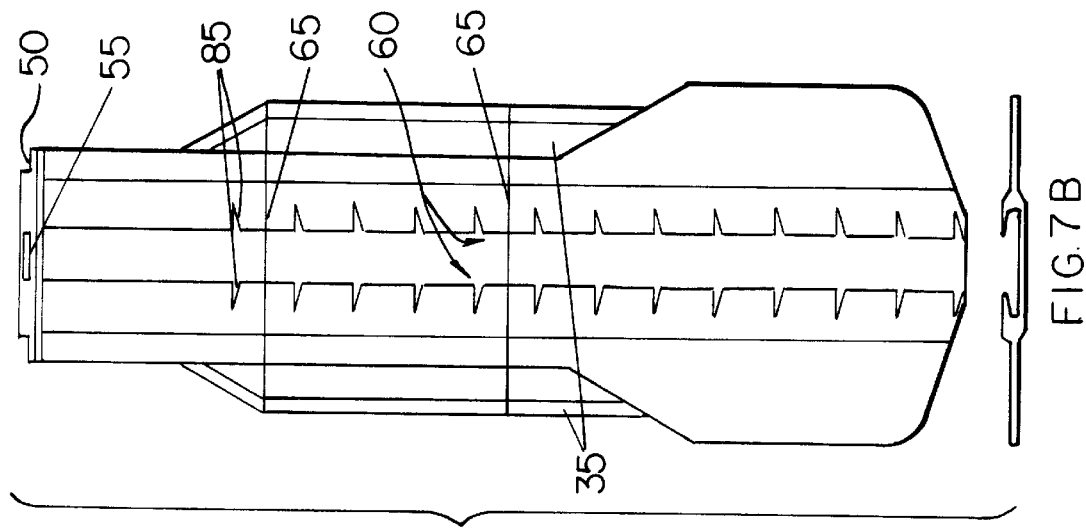
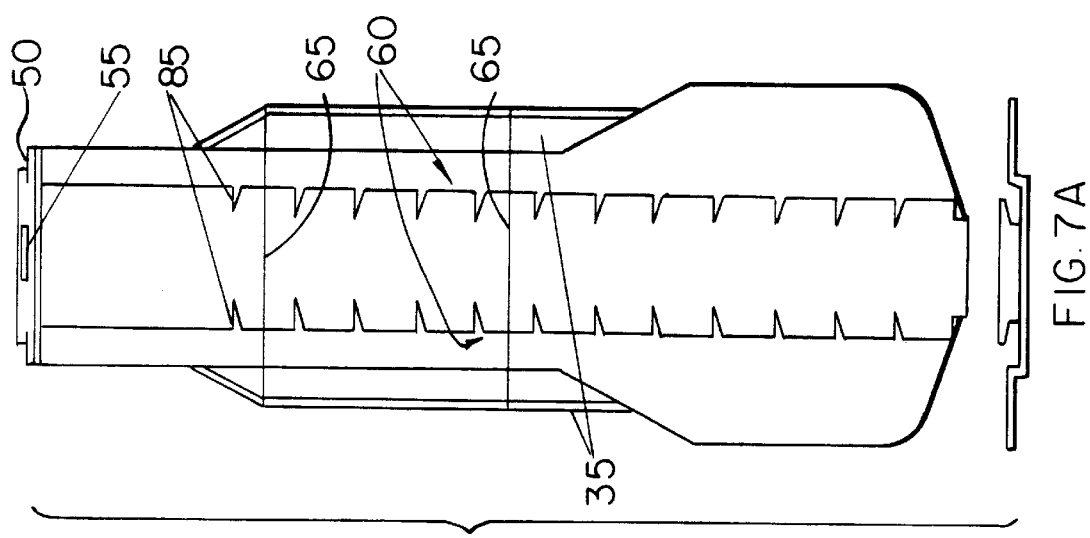

ents. This application, thus, describes a device useful for reducing the amount of splash-back thrown from a moving vehicle, said device being adjustable to a plurality of positions, thereby facilitating the proper placement of said splash guard via specific adjustment.

ADJUSTABLE SPLASH GUARD ASSEMBLY

RELATED APPLICATIONS

Disclosure document no. 409661 was filed on Dec. 3, 1996.

FIELD OF INVENTION

The present invention relates to the general field of automotive accessories, and more specifically, to an adjustable splash guard for over and/or behind the wheels of vehicles. This application, thus, describes a device useful for reducing the amount of splash-back thrown from a moving vehicle, said device being adjustable to a plurality of positions, thereby facilitating the proper placement of said splash guard via specific adjustment.

BACKGROUND AND PRIOR ART

It is common for splash guards, also known as mud flaps, to be employed via attachment rearward of the rear wheels of vehicles. Said splash guards are useful for protecting the rear quarter panels of vehicles as well as following vehicles from flying debris. In order to do so, splash guards must be properly positioned on each vehicle. That is, splash guards must be adjusted to certain specifications of each vehicle, in addition to being adjusted based on the load of that vehicle, such that the splash guard is suspended a certain distance from the ground in order to prevent it from coming in contact with either the ground or the vehicle's moving wheels.

Generally, splash guards are bolted or riveted in place on said vehicles, thus, preventing their loss via semi-permanent attachment. The rivets, or whatever attachment means is employed, have a tendency to corrode while in use. This corrosion prevents the easy adjustment and/or replacement of said splash guards. Furthermore, the attachment means is not, in general, readily accessible or easy to remove. This invention relates to an easily adjustable splash guard for preventing splash-back, for example, of mud and debris, onto the vehicle being driven or into the field of vision of a following vehicle. With the assembly disclosed herein, the user may properly position the mud flap portion of the assembly on the vehicle in relation to the ground, thereby preventing said splash-back. In addition, the user may easily adjust and/or replace the mud flap portion of the assembly—without the use of tools—thereby facilitating the proper usage of same.

The prior art discloses several different types of mud flap or splash guard devices. U.S. Pat. No. 5,460,412, to Vincent et al., describes a rigid mud flap permanently attached to a vehicle and having a flexible portion that may be removed for replacement thereof. It does not disclose a splash guard that can be easily adjusted in relation to both the vehicle and the ground.

U.S. Pat. No. 5,026,094, to Haddox, discloses an adjustable mud flap assembly suitable for mounting to a transverse bar member of a trailer hitch and useful for preventing projectiles from impinging on a tow trailer. Said assembly, in fact, prevents splash-back from hitting the trailer in tow by being vertically adjustable, however, it is not intended for attachment directly to the vehicle, it is not easily adjustable, nor is it intended for use in preventing splash-back into the field of view or preventing damage to other vehicles.

Haddox, U.S. Pat. No. 5,121,944, a continuation-in-part of U.S. Pat. No. 5,026,094, describes an improvement thereon. Said assembly is described as having an additional mode of adjustment. It still does not describe an easily adjustable splash guard for attachment directly to the vehicle.

Shortcomings found in the prior art include, for example, the need of tools to make a mud flap position adjustment, mud flaps that do not attach directly to the vehicle leaving the rear quarter panels unprotected, and mud flaps that are not vertically adjustable. The present invention overcomes these drawbacks by integral incorporation of a tool free, vertically adjustable, true splash guard with an assembly that is attached directly to a vehicle and positioned such that the assembly, as a whole, protects the vehicle and any following vehicle from debris splash-back. The assembly of the instant invention is highly suitable for the above-stated purposes as it is made from semi-rigid polymeric material, for example, polyethylene, polypropylene or polystyrene, and has adjustable and replaceable parts. While prior art is suitable for preventing certain back splash, none of the prior art can be easily and efficiently used by the average vehicle owner-operator, nor does it provide the necessary protection from back-splash to the vehicle being driven and the following vehicle. The present invention provides a tool-free, vertically adjustable splash guard assembly, molded from polymeric plastic material—an ideal material of construction for the present invention. Polymeric plastics are durable, tough, will not split or splinter and can be formulated to possess significant fire and chemical retardant properties. Therefore, splash guard assemblies made according to the present invention last a long time and are completely safe for their intended use.

SUMMARY OF THE INVENTION

This invention is based on a novel concept for the attachment and adjusting of splash guards on vehicles. The present invention is defined by a mounting bracket and a mud flap, said mounting bracket consisting of an adjustment body and a mounting body, said splash guard capable of being attached to, and while attached, easily adjusted in relation to said vehicle as well as the ground.

The present invention, when practiced as disclosed herein, prevents the displacement or splash-back of debris, for example, dirt, stones and water, from being thrown up and behind a moving vehicle, while preventing the build up of same between the vehicle and the instant splash guard assembly. Said splash guard assembly is applicable to all vehicles capable of carrying conventional splash guards, as well as those vehicles having the capability of being converted to carry a splash guard. The instant invention, thus, is useful to prevent dirt and debris from impairing the field of vision of following vehicles, to prevent damage thereto from the same debris, to prevent damage to the carrying vehicle's rear quarter panels and/or body panels directly rearward to the front tires and aid in the prevention of debris build-up on the carrying vehicle, but is not intended to be limited to these uses.

In its broadest terms, the splash guard disclosed herein is comprised of a semi-rigid or rigid material forming an integrally and functionally combined mounting bracket and mud flap for attachment to a vehicle and adjustment thereon. More specifically, the instant invention comprises a splash guard assembly capable of, at least, vertical adjustment while installed on a vehicle. Said vertical adjustment is accomplished without special or any tools, simply by applying pressure with the human hand. Accordingly, it is an object of the invention to guard against splash-back of dirt and debris from a moving vehicle. An additional object of the present invention is easy, tool free adjustment of the splash guard assembly while mounted on a vehicle.

In a first embodiment of the invention, a universal mounting bracket having a generally L-shaped mounting body is employed.

In an alternate embodiment of the invention, a custom mounting body conforming to the specific measurement and shape of a certain vehicle is employed.

Next, in another embodiment of the invention, a number of mud flap portion variations for the attachment and adjustment means are employed in order to accommodate the adjustment body. Vertical adjustment is accomplished by a tab means, i.e., L-shaped or triangular-shaped tabs.

All embodiments of the instant invention include the same general methodologies, objects and element; a splash guard that is used to prevent splash-back of dirt and debris, as well as being, at least, vertically adjustable without the use of tools while attached to the vehicle, and may further comprise certain customizing features and specifications.

Other features and advantages of the present invention will become apparent from the following detailed description, taken in conjunction with the accompanying figures, that illustrate by way of example, the principles of the instant invention.

BRIEF DESCRIPTION OF THE DRAWINGS

FIG. 4a depicts the mud flap portion of the instant invention, having grooves corresponding to the mud flap adjustment mechanism shown in FIG. 3a.

FIG. 4b depicts the mud flap portion of the instant invention, having grooves corresponding to the mud flap adjustment mechanism shown in FIG. 3b.

FIG. 6b is an exploded side view of the corresponding to the alternate adjustment mechanism shown in FIG. 6a.

FIG. 7a is an exploded view of the mud flap portion of an alternate embodiment of the instant invention, having outwardly facing channels and adjustment slots corresponding to the adjustment mechanism shown in FIG. 6a.

FIG. 7b is an exploded view of the mud flap portion of an alternate embodiment of the instant invention, having inwardly facing channels and adjustment slots corresponding to the adjustment mechanism shown in FIG. 6b.

REFERENCE NUMERALS IN THE DRAWINGS

Figure 1:
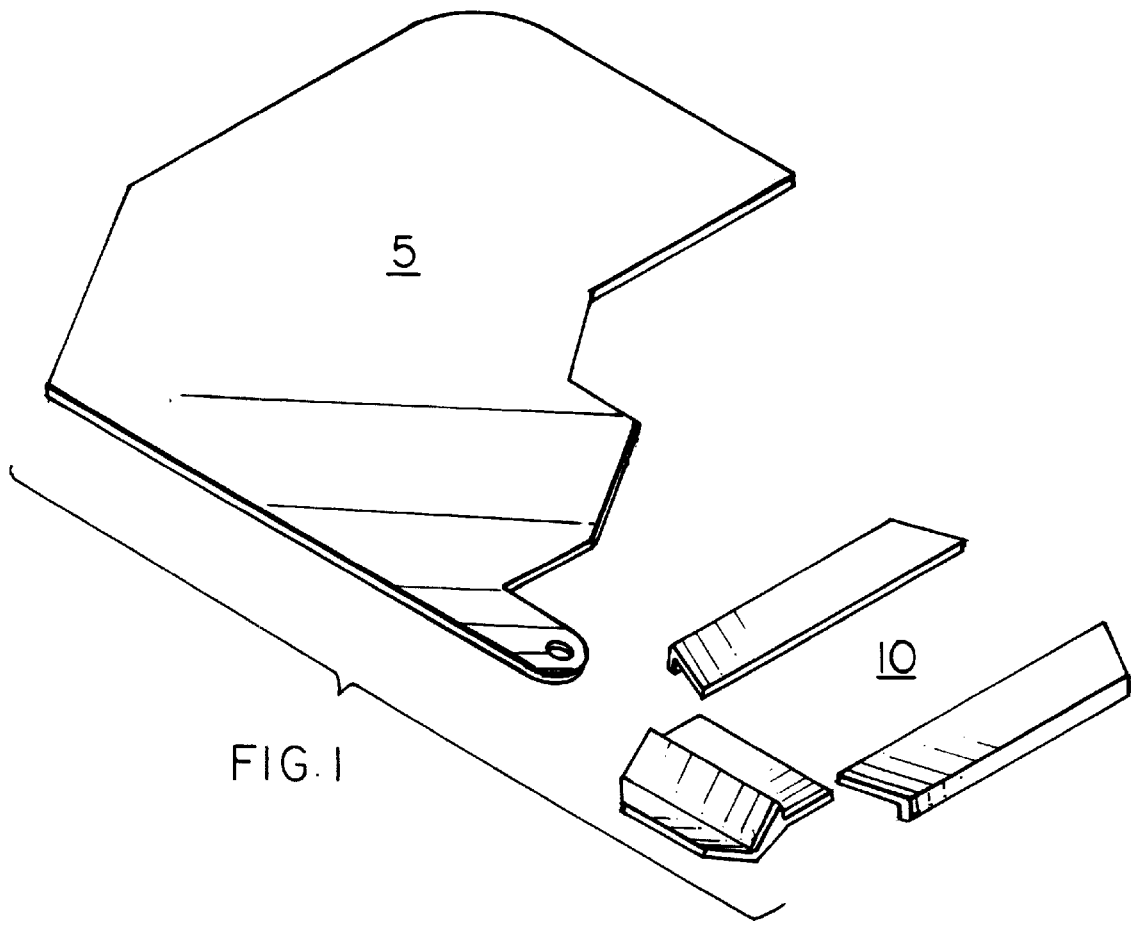
FIG. 1 depicts a perspective representation of the mounting body and adjustment body in accordance with the invention.

| | |
|---|---|
| 5 | Universal mounting body/bracket |
| 10 | adjustment body/mechanism |
| 15 | mounting bracket |
| 20 | adjustment body angled tabs |
| 25 | adjustment body lug |
| 30 | adjustment body flexible panel |
| 35 | adjustment body angled panel |
| 40 | adjustment body finger hold |
| 45 | adjustment body adjustment mechanism |
| 50 | adjustment mechanism flap |
| 55 | adjustment mechanism latch |
| 60 | adjustment mechanism mud flap channels |
| 65 | adjustment mechanism one-way hinges |
| 70 | adjustment mechanism mud flap adjustment grooves |
| 75 | mudflap |
| 80 | adjustment body pendulum |
| 85 | adjustment mechanism mud flap adjustment slots |
| 90 | adjustment mechanism latch aperture |
| 95 | additional optional apertures |
| 100 | spring |
| 105 | pivot pin |
| 110 | built-in stop |
| 115 | tabs |
| 120 | tab slots |
| 125 | optional apertures |

DETAILED DESCRIPTION OF THE PREFERRED EMBODIMENT

It is to be understood that both the foregoing general description and the following detailed description are exemplary and explanatory only and are not restrictive of the invention as claimed.

The present invention provides an adjustable splash guard assembly useful for reducing the amount of splash-back thrown from a moving vehicle by deflecting the same, as well as preventing its buildup between said splash guard assembly and said vehicle. It is recognized by those skilled in the art that a broad range of splash guard assemblies may be practiced in accordance with the presently disclosed invention.

The details of the basic structure of the preferred embodiment of the invention include two major portions: a mounting bracket portion and a mud flap portion. The mounting bracket portion further consists of an adjustment body and a mounting body. The adjustment body consists of two parallel, angled tabs positioned generally perpendicular to an adjustment mechanism integrally formed from the bottom edge of the mounting body. Said tabs may be angled either inwardly or outwardly, depending on the specific adjustment means employed. The mud flap portion of the assembly has directly corresponding channels and either grooves or slots that, when the mud flap is inserted contiguously into said adjustment body, said channels and grooves or slots enable indexed vertical adjustment therein, in increments predetermined by the spacing between each groove or slot.

As disclosed, the bulk of the apparatus is composed of a material that facilitates the necessary semi-rigid and resilient structure of the instant invention, for example, plastics, rubbers or elastomers. The preferred material, polypropylene, is a chemically stable, heat and cold resistant material that is light weight, semi-rigid, resilient and sturdy. That is, it is unaffected by such things as extreme temperatures, ethylene glycol, salt or deicers. More specifically, it is formulated so as not to split, splinter or crack and to possess significant fire retardant properties. Therefore, the assemblies made according to the instant invention last a long time and are completely safe for their intended use.

The splash guard assembly disclosed herein is attached to the vehicle, adjusted in relation to the specific vehicle, and used for deflecting dirt and debris thrown from spinning wheels of the vehicle, thereby preventing the same from flying behind the vehicle when moving and obstructing a subsequent or following vehicle's field of vision or causing damage thereto.

Referring first to FIG. 1, the universal embodiment of the instant invention is a vertically adjustable vehicle splash guard assembly consisting essentially of two parts in combination, a mounting bracket 15 and mud flap 75. This combination is made and designed in a number of standard sizes in order to accommodate most vehicles currently on the road. Two specific embodiments of the mounting bracket 15 are disclosed herein.

The two instant mounting bracket 15 embodiments disclosed herein, reflect alternate means by which each mounting bracket 15 may be semi-permanently attached to a vehicle. Further, either embodiment of the mounting bracket 15 is comprised of two distinct portions itself: the adjustment body 10 and the mounting body 5. Said adjustment and mounting bodies 5, 10 are integral with the mounting bracket. That is to say, the design of the mounting bracket 15 readily lends itself to being molded out of a single piece of material. However, it is not necessary to do so.

Figure 2:
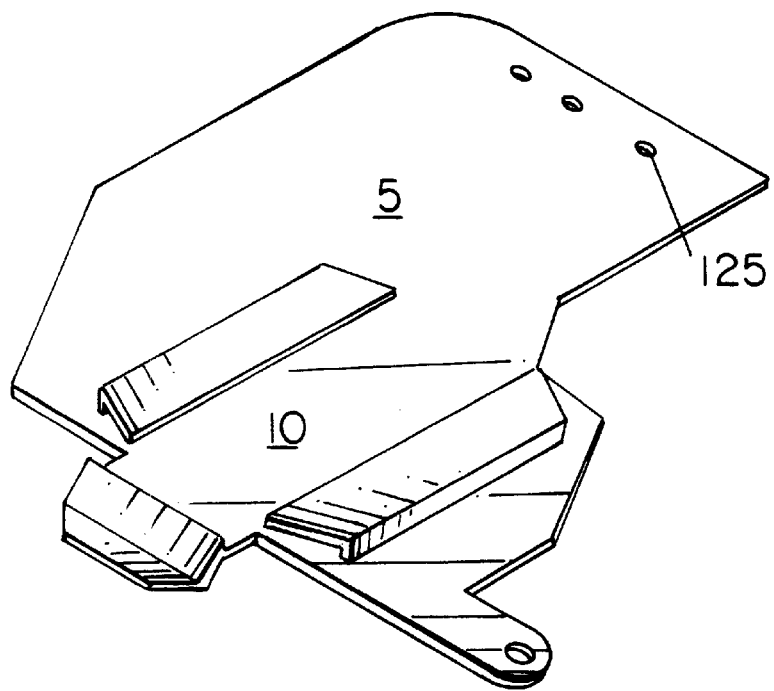
FIG. 2 is a perspective view showing the structural relationship between the mounting body and adjustment body, thus, in combination creating a universal mounting bracket.
Figure 3A:
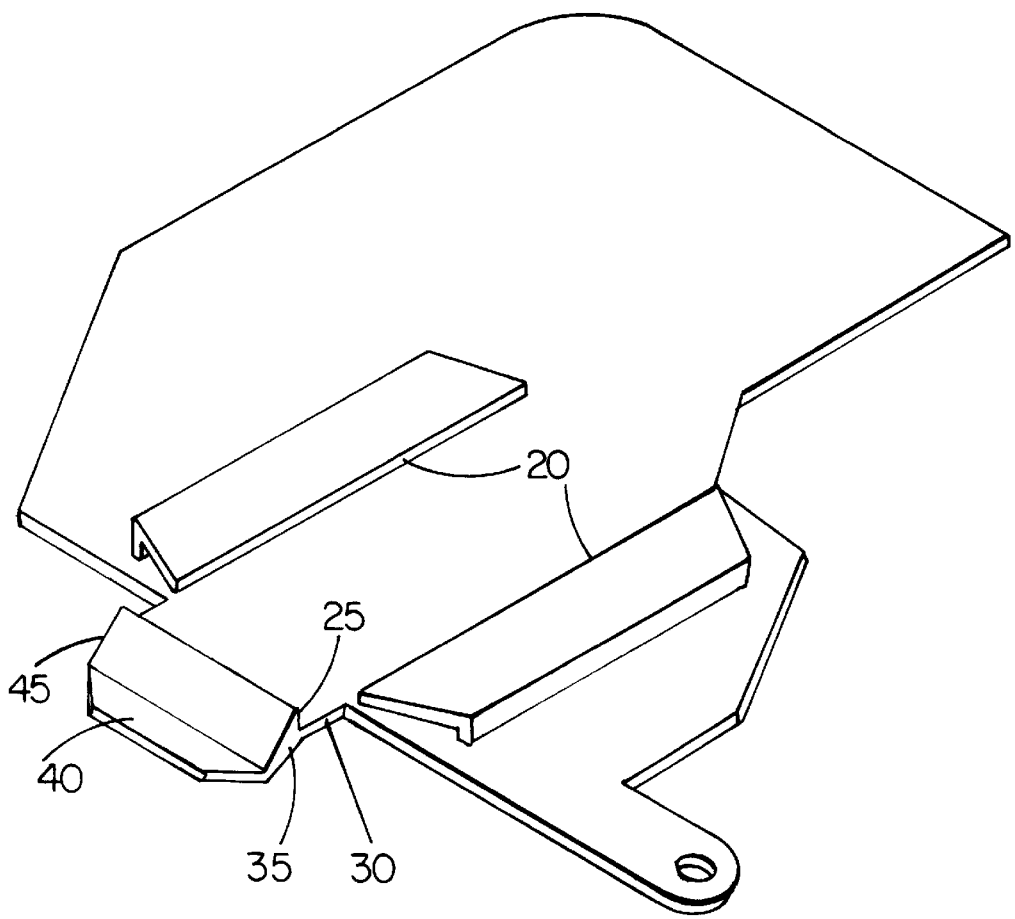
FIG. 3a shows an isometric view of the mounting bracket, including the mud flap adjustment mechanism, having inwardly facing tabs.

A first embodiment of the mounting body 5 includes a universal mounting bracket 15, thus, fitting many applications (FIG. 2). In appearance, the universal mounting bracket 15 is similar to a conventional splash guard of the prior art, but shorter in length. The mounting body 5 is mostly flat, having a general L-shape in order to follow the curvature of the vehicle's outer fender. As shown in FIG. 3a, in this embodiment, moving from top to bottom, the mounting bracket 15 gradually and evenly gains thickness, such that the bottom is approximately 50% thicker than the top giving added strength and rigidity and giving the bracket an overall wedge-like shape. Alternatively, the mounting bracket is manufactured having a certain thickness at its generally top portion and a different thickness at its generally bottom portion. However, a gain in thickness is not a necessary element of the invention. An extension from one side of the bottom edge of the mounting body 5 gives added mounting flexibility as well as providing better stability of the unit.

As shown in FIG. 3a, the enlarged mounting body surface area of the universal mounting bracket 15 facilitates the horizontal mounting of the assembly in various positions at the bottom of the vehicle fender. Furthermore, the universal mounting body 15 lends itself to mounting on various brackets in that it is not limited to being mounted to the bottom of the fender and can be easily customized by trimming it to fit any bracket. It may be mounted to a homemade bracket, a professionally manufactured and commercially available bracket or to an already installed bracket system. The side of the mounting body 15 facing the tire of the vehicle carries the adjustment body 10.

A second embodiment has a custom mounting body 15 of the mounting bracket. That is, it conforms and fits to a specific vehicle giving it a look of an integral part of that vehicle.

The second portion of the mounting bracket 15, the adjustment body 10, is designed with a number of variations, four of which are specifically disclosed herein, though infinite variations are possible in the way the mud flap attaches to the mounting bracket 15 and is adjusted. Correspondingly, four variations on the mud flap 75 and the means of attachment and adjustment are disclosed herein, in order to accommodate the adjustment body 10 embodiments. Any directly corresponding combination thereof is an acceptable means. First described, is how the adjustment body 10 in the first two embodiments allows the mud flap 75 to be attached to the mounting bracket 15, the means of vertical travel. This is accomplished by vertical tabs 20 that, in these two embodiments, allow the mud flap 75 to be attached to the mounting bracket 15. Said vertical tabs 20 for the instant embodiments are L-shaped, see FIGS. 3a and 3b, having an attachment point running the length of the short side of the L. In two alternative embodiments discussed herein, said tabs 20 are triangular in shape. As shown in FIGS. 4a and 4b, the tabs 20 fit contiguously inside of corresponding vertical channels 60 on the mud flap 75, in which the desired vertical movement is accomplished by sliding the mud flap 75. The tabs 20 hold the mud flap 75 a short distance, no less than approximately ⅛ inch, or the equivalent size of a common screw head, from the mounting body 5, such that heads of mounting screws do not interfere with the desired vertical motion of the mud flap 75, and thus, facilitate efforts to keep dirt and debris from getting between the mud flap 75 and mounting bracket 15. Mud flaps 75 in FIGS. 4a and 4b correspond to mounting brackets 15 in FIGS. 3a and 3b, respectively.

The mud flap vertical channels 60 run almost the full length of the mud flap 75 providing a large range of movement. The ends are open at the top of the channels 60 for insertion and mounting of the mud flap 75 to the mounting bracket 15. To stop the mud flap's 75 vertical motion and prevent it from detaching from the mounting bracket 15 at the bottom, the channels 60 are closed on one side. Which side is closed is fully dependant on the configuration and orientation of the L-shaped or triangular shaped tabs 20. The mounting bracket is sided—the mud flaps are completely interchangeable and true mirror images of each other. Hence, the splash guard assembly as constructed for a certain side of a vehicle is a non-superimposable mirror image to an assembly constructed for the opposite side of a vehicle. However, an embodiment wherein the mounting brackets and/or the mud flaps are symmetric, and therefore, mirror images, is envisioned; asymmetric construction of the mounting brackets is not a required element of the present invention.

Next, locking the mud flap 75 into predetermined and indexed positions are horizontal, evenly spaced triangular shaped grooves 70, as shown in FIGS. 4a and 4b. These grooves 70 correspondingly fit a triangular shaped lug 25, part of the adjustment body 10 of the mounting bracket 15. The lug 25 is designed to be finger operated and is placed in an easily accessible area on the mounting bracket 15, free of obstruction, but varying in location based on specific design differences.

Figure 5:
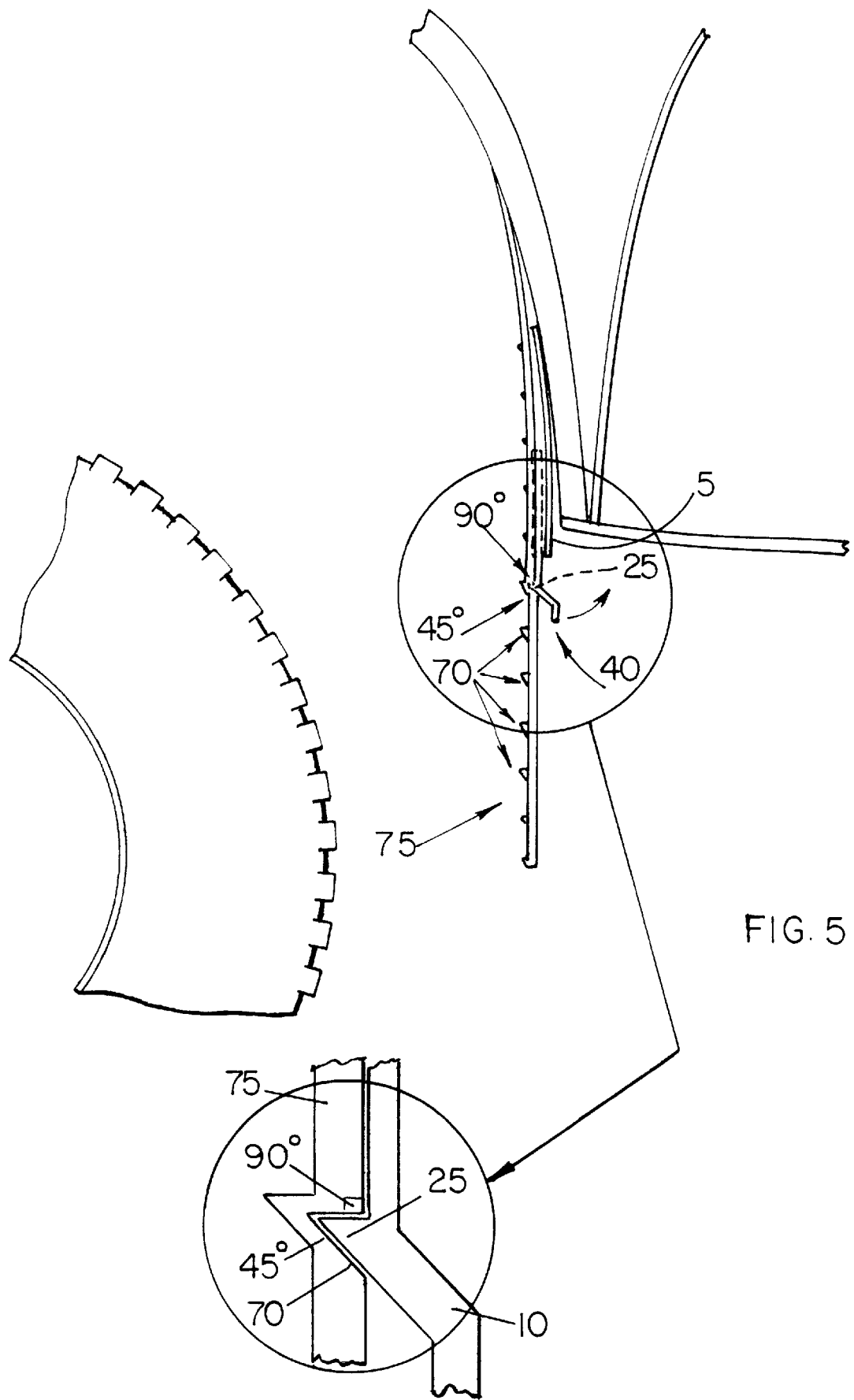
FIG. 5 depicts two exploded views of the structural relationship, including angles, between the vehicle and properly mounted components of the present invention.

The finger operated adjustment mechanism 45 is a flexible panel 30 with a finger hold 40 extending from the bottom of the mounting bracket 15. As shown in FIG. 5, when the mounting bracket 15 is properly inserted, the flexible panel 30 and finger hold 40 hang below the body of the vehicle or bracket, thus, helping eliminate impaired movement of the adjustment mechanism 45. Also, contiguous with the flexible panel 30 of the adjustment mechanism 45 is a triangular lug 25 running horizontally the width of the panel. The horizontal lug 25 is positioned at approximately, but not necessarily, a ninety degree (90°) angle to the flexible panel 30. Angling away from the lug 25 at the end of the flexible panel 30 is a second angled panel 35. The second panel 35 is positioned at approximately, but not necessarily, a forty-five degree (45°) angle, and at a length so as to allow average sized human fingers under a third, finger hold panel 40 contiguously positioned at the end of the second angled panel 35. This finger hold panel 40, as seen in FIG. 3a, is generally perpendicular to the vertical tabs 20 on the mounting bracket 15 and allows the user a finger enabled hold necessary to apply sufficient force to overcome the flexible panel's 30 naturally pliable characteristics, thus, disengaging the lug 25 from a corresponding groove 70 on the mud flap 75. After force is applied and released, the resilient adjustment mechanism 45 resumes its natural locking position. This finger operated adjustment mechanism 45 allows easy adjustment, and due to the configuration of the triangular adjustment lug 25 and its relationship to the corresponding mud flap grooves 70, the finger adjustment mechanism 45 only has to be utilized in lengthening the mud flap 75. Simple upward pressure shortens the mud flap portion in relation to both the vehicle and the ground.

When the mounting bracket 15 and mud flap 75 in combination are properly mounted to the vehicle, in most cases, they run at close to perpendicular to the ground, as shown in FIG. 5. Due to the approximate 90° angle, or slightly greater, of the lug 25 of the adjustment mechanism 45 and corresponding mud flap grooves 70, in relation to the flexible panel 30 of the adjustment mechanism 45, the surfaces are close to parallel to the 5 ground. The angles employed in the configuration of the instant invention make it virtually impossible to pull down the mud flap 75, down unless disengaging the adjustment lug 25 from the mud flap grooves 70 using the adjustment mechanism 45. Therefore, the adjustment mechanism 45 is used only for lengthening. For shortening of the mud flap 75, the two angled edges of the adjustment lug 25 and mud flap groove 70 are at about a 45° angle to each other, so it is necessary only to push or pull up on the mud flap 75 with one hand using sufficient force to overcome the flexible panel's natural pliability of the two 45° angle surfaces sliding against each other, until the lug is disengaged from the groove. When using the adjustment mechanism 45 for lengthening the mud flap 75, one hand pulls down and the other only need engage the finger hold with sufficient force to overcome the pliable characteristics of the flexible panel 30 and disengage the lug 25 from the groove 70 of the adjustment mechanism 45.

A key feature in all means of attachment and adjustment is the location between the mounting bracket 15 and the mud flap 75 that helps to protect from dirt, debris or any projectiles propelled by the vehicle's spinning tires. In the first of the two L-shaped tab 20 embodiments of the adjustment body 10, the tabs 20 angled inwardly, are attached to the mounting body 5 at the outer edges of the tabs 20, along the length of the short side of the "L," such that the short side of each "L" is closest to the outer edges of the mounting body 5, FIG. 3a. The tabs 20 are parallel to one another. The L-shaped tabs 20 are defined by two planar surfaces at approximately a 90° angle to each other; the first planar surface being a rectangular planar surface defining the short side of the "L" and the second planar surface being a trapezoid-shaped planar surface defining the long side of the "L". In this embodiment, the obtuse angle of the trapezoid-shaped planar surface is closest to the outer edges of the mounting body. The angled tabs 20 provide all embodiments with the added feature of being self-cleaning in the event that any dirt or debris gets into the mud flap channels 60. All tabs 20 are angled in such a way as to direct the dirt and debris out of the channels 60 and away from the adjustment mechanism 45. Thus, in the instant embodiment, the tabs 20 are angled outwardly, causing dirt and debris to be directed away from the middle of the tabs 20 and so in this embodiment the adjustment mechanism 45 is positioned between the tabs 20, at the bottom of the mounting bracket 15.

Figure 3B:
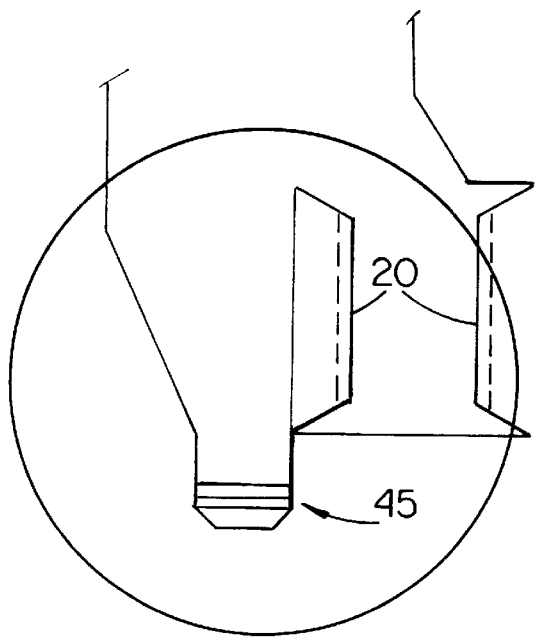
FIG. 3b shows an exploded view of the adjustment mechanism having outwardly facing tabs.

In a second embodiment shown in FIG. 3b, of the adjustment body 10 with L-shaped tabs 20, the tabs 20 angle inwardly, running parallel to each other and are attached to the mounting body 5 such that the short side of the "L," the length of which is the attachment point, is facing and closest to the opposing tab 20. Again, the L-shaped tabs 20 are defined by two planar surfaces at approximately a 90° angle to each other; the first planar surface being a rectangular planar surface defining the short side of the "L" and the second planar surface being a trapezoid-shaped planar surface defining the long side of the "L". In this embodiment, the acute angle of the trapezoid-shaped planar surface is closest to the outer edges of the mounting body. Thus, the tabs 20 are angled such that they direct dirt and debris from the mud flap channels 60 toward the middle of the tabs 20. The adjustment mechanism 45 is placed to the right or left of the bottom of the mounting bracket 15 depending on its mounting orientation. That is, onto which side of the vehicle it is to be mounted. For example, FIG. 3b shows the right side mounting bracket 15 and the adjustment mechanism 45 oriented such that when facing the adjustment body 10, it is located on the left side for easy access and without operation obstruction.

Figure 6A:
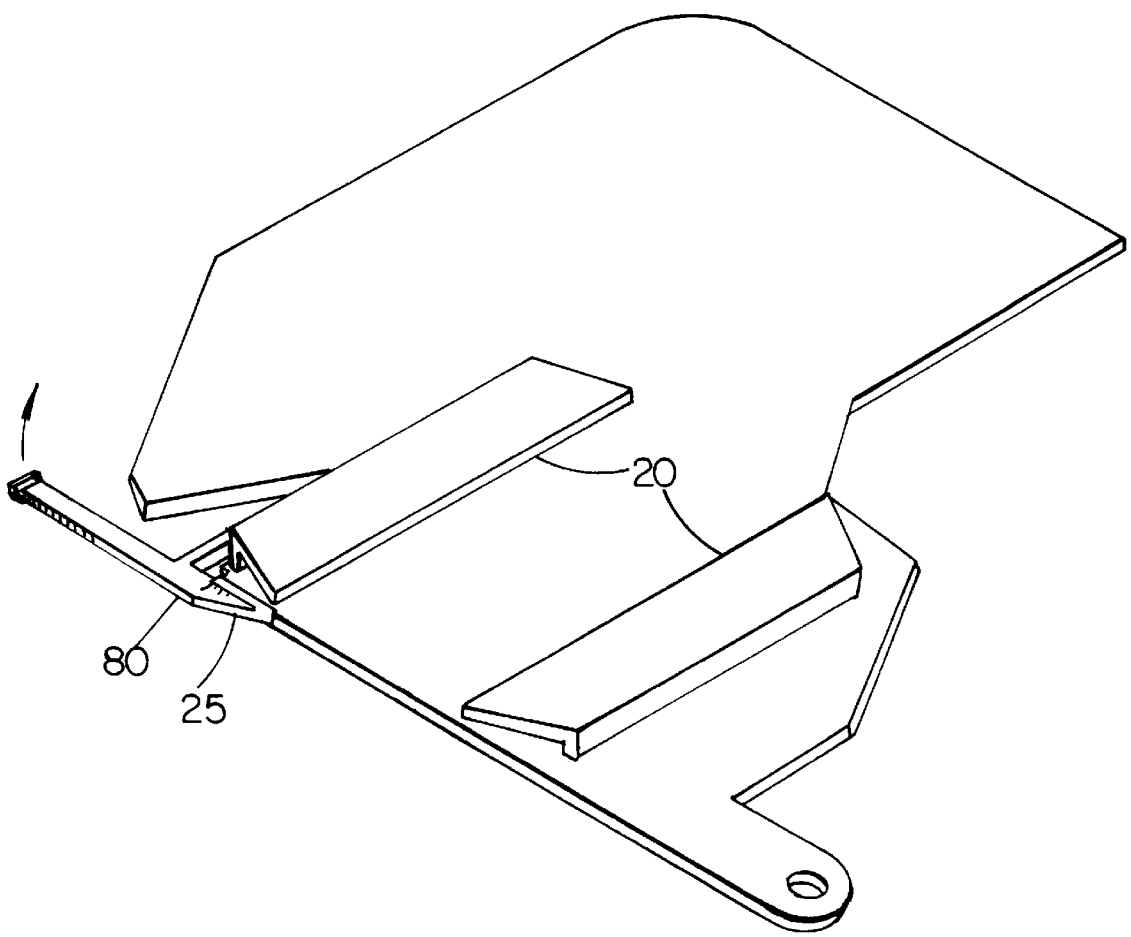
FIG. 6a is a perspective view, including the pendulum lug, of an alternate adjustment mechanism.
Figure 6B:
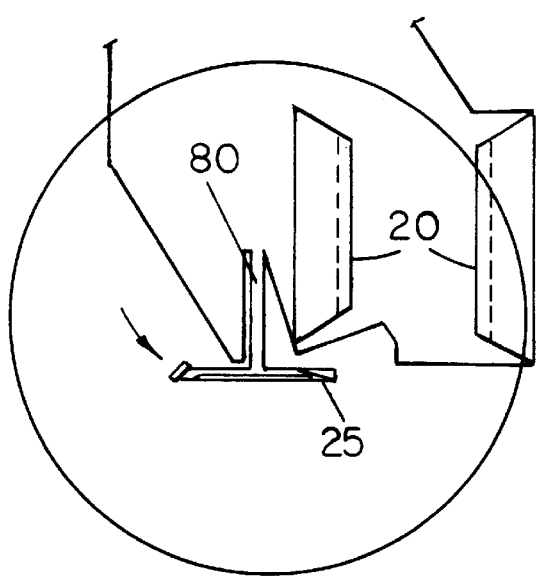

Describing the last two embodiments of adjustment and attachment, the tabs 20 are triangular, FIGS. 6a and 6b, and the adjustment mechanism 45 is pushed or pulled from the side of the mounting bracket 15. Mud flaps 75 shown in FIGS. 7a and 7b correspond to right side mounting brackets 15 of FIGS. 6a and 6b, respectively. Also, in the instant two embodiments, instead of grooves 70, there are triangular slots 85 in the sides of the mud flap channels 60 that are the means of vertical adjustment. Slots 85 are located on a certain edge depending upon the configuration of the tabs 20 and the motion of the adjustment mechanism 45 being pushed or pulled. Using an adjustment mechanism 45 for lengthening is the same as the previously described embodiments—the same angles and configuration of the adjustment mechanism's triangular lug 25, and the mud flap's triangular slots 85.

In a third embodiment of adjustment and attachment, the triangular tabs 20 face each other, FIG. 6a. Attached to the mounting bracket 15, the tabs 20 angle inward and run parallel to one another. At the ends of each tab 20, angles are the same as previously described. Again, directing dirt and debris away from center of tabs 20. The way the mud flap 75 is secured into position is different in that instead of pulling back on the adjustment mechanism 45, it is pushed or pulled from the side of the mounting bracket 15.

The adjustment mechanism 45 is a pendulum arm 80, referenced in FIGS. 6a and 6b, having a finger operated panel at one end for pushing or pulling and a triangular adjustment lug at the other. This pendulum arm 80 hangs at the end of a pliable piece of the mounting bracket 15. Like the other adjustment mechanisms 45 disclosed herein, all parts are integral and employ the naturally pliable characteristics of the material to resume original locking position after being released. Incorporated in the embodiment of the mounting bracket 15 is an opening or aperture in the mounting bracket 15 allowing the pushing or pulling motion of the adjustment mechanism 45. Motion in the adjustment mechanism 45 in the third embodiment, because of the direction of the tabs 20 to the corresponding channels 60 of the mud flap 75, FIG. 7a, results in a pulling motion of the adjustment mechanism 45. The channel's 60 edges of the mud flap 75 face outward, thus, to disengage the adjustment lug 25 from corresponding slots 85 in the mud flap's channel 60, the lug 25 must be pulled out of the slot 85.

In a fourth embodiment of adjustment and attachment, as shown in FIG. 6b, like the second embodiment, triangular tabs 20 like the L-shaped tabs, described supra, attach the mounting body 5 on the inside edges and face outward. The ends of the tabs 20 are angled as described supra. Different in this embodiment is the adjustment mechanism 45, it is pushed from the side of the mounting bracket 15. The mud flap channels 60 face inward and correspond to the triangular, outward facing tabs 20, FIG. 7b. To disengage lugs 25 from slots 85, the adjustment mechanism 45 is pushed.

Figure 8A:
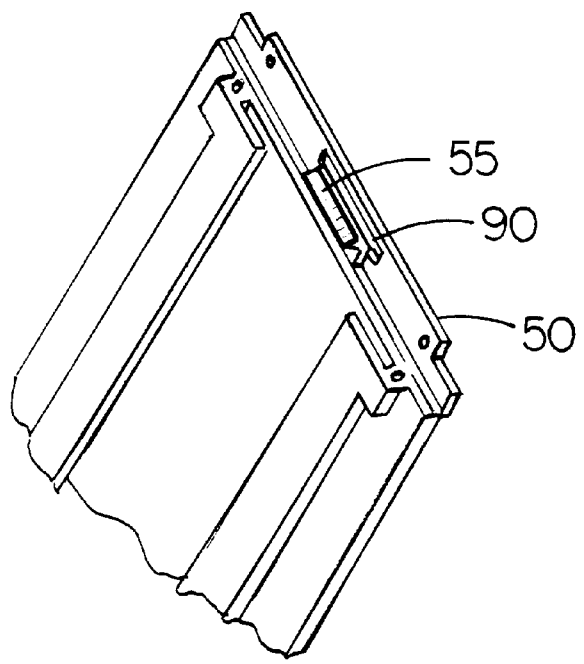
FIG. 8a is a top perspective view of the mud flap portion of the splash guard and latch mechanism.
Figure 8B:
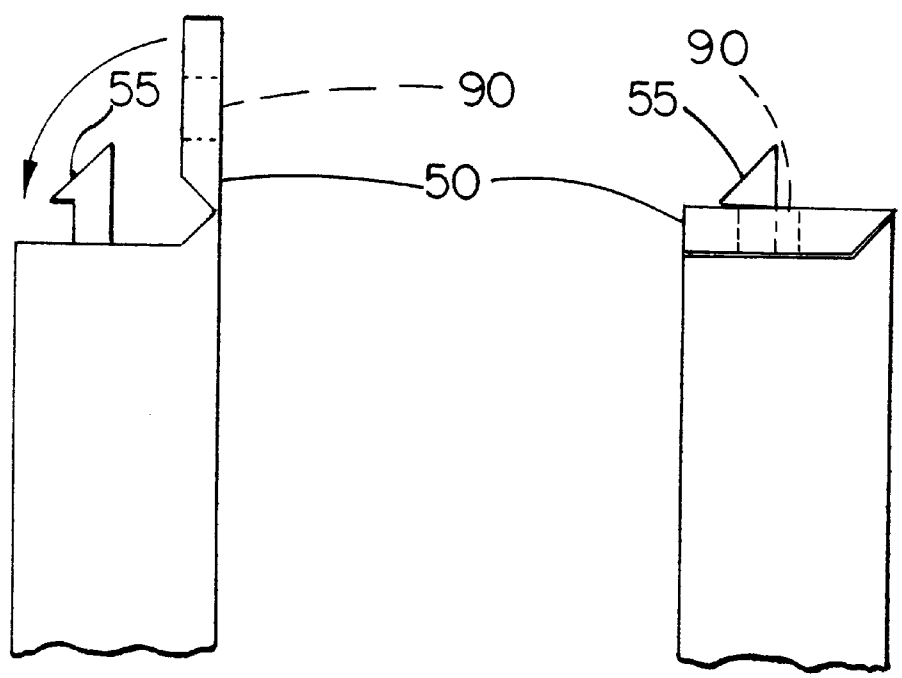
FIG. 8b is a side perspective view of the mud flap portion of the splash guard and latch mechanism.

Describing the mud flap 75 of the present invention, depicted in FIGS. 4a, 4b, 7a and 7b, some of its characteristics have been described in detail as to attachment and adjustment with its counter part, the mounting bracket 15. In appearance, the mud flap 75 is generally wider at the bottom than the top, having channels 60 as the means of attaching it to the mounting bracket 15 and allowing vertical motion. Because these channels 60 run almost the full length of the mud flap 75, and also because they are the thickest part of the mud flap 75, the channels 60 give greater rigidity and help steady the mud flap from swaying. At the top of the mud flap 75, is a flap of material 50 that is folded over to close off openings of channels 60 and then locked into place with a latch mechanism 55, see FIGS. 8a and 8b. The flap 50 has an aperture therethrough, a hole or slot, that corresponds to the tooth-like latch mechanism 55. When the flap 50 is folded over, its angled tip forces the latch mechanism 55 backwards and locks the flap 50 in a closed position. When the flap 50 is folded all the way over, the hook-like latch mechanism 55 locks the flap 50 down and closes the channels 60. Moving from bottom to top, the mud flap 75 generally narrows in width, and on each side of the mud flap 75 are thin panels angled on the outside edges, or with a small thicker boarder on their outside edges, allowing the mud flap when being shortened to go up inside and follow vehicle's inner fender contour rather than the outside fender's edge. Thinner panels lend themselves to being more flexible and following contours easier. Edges angled away from the mud flap 75, toward the tire of the vehicle, or having a thicker outside edge, help eliminate the tearing of the thin panels.

Figure 9A:
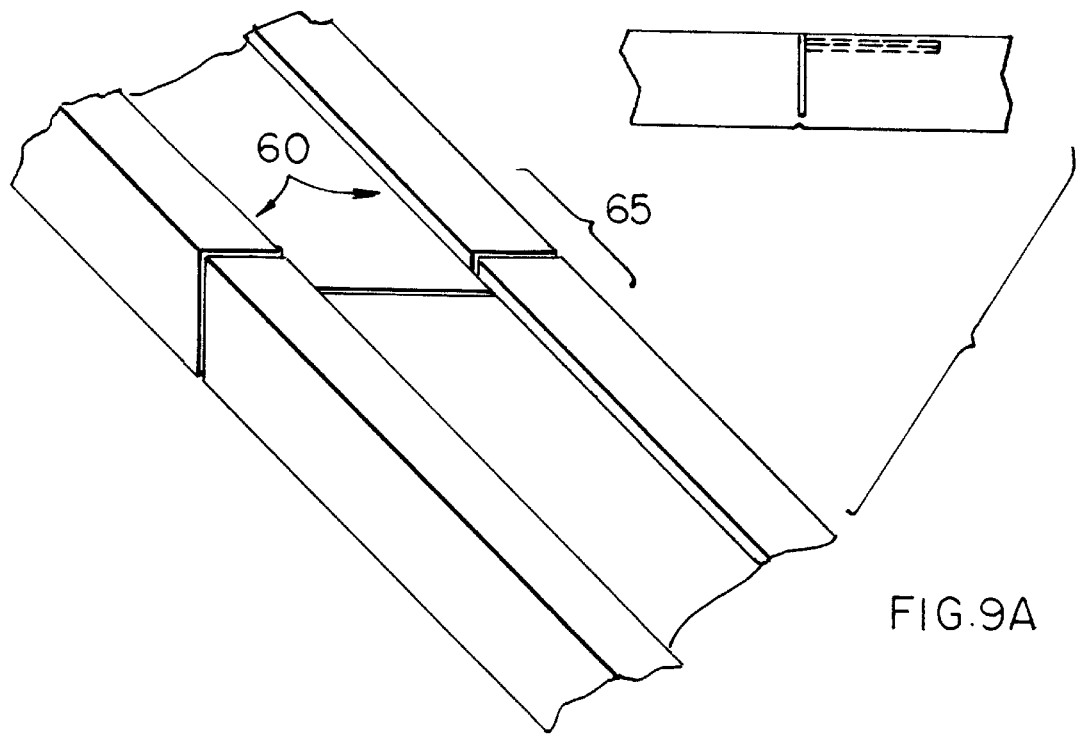
FIG. 9a is a perspective and side view of the mud flap channels with the hinge in the closed position.
Figure 9B:
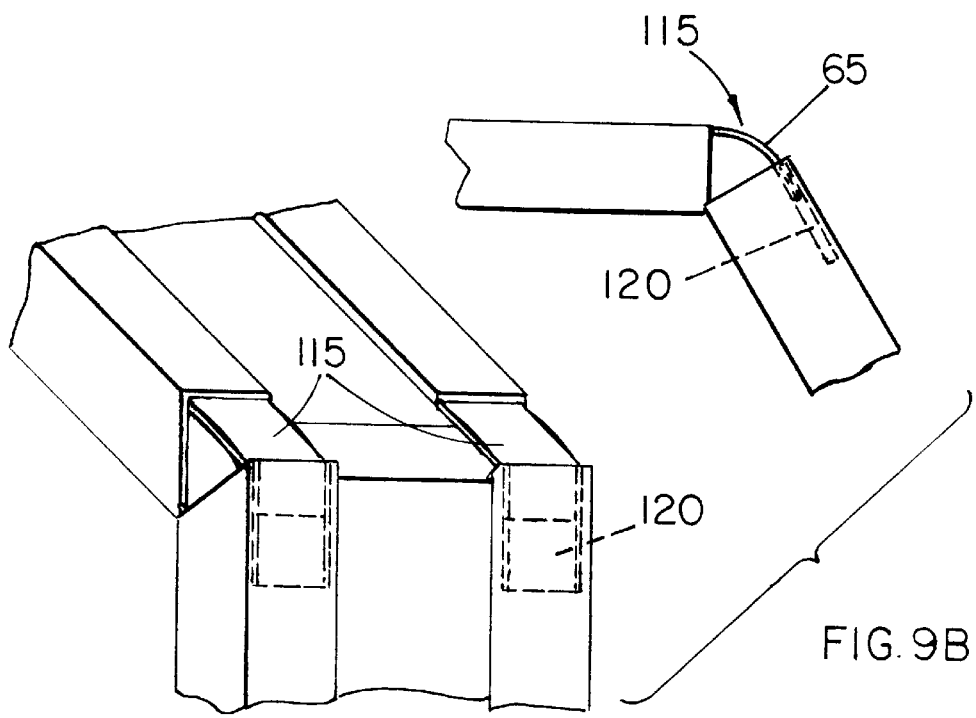
FIG. 9b is a perspective and side view of the mud flap channels with the hinge and tabs in the open positions.

FIGS. 9a and 9b show that in some embodiments, a uni-direction or multi-directional hinge 65 or hinging means is incorporated for the shortening of the mud flap 75. See sectional lines A—A and B—B of FIGS. 7b and 9a for examples of possible hinge placement. Said hinge 65, enhances the pliability of the mud flap and facilitates its following of the contour of the inner fender of the vehicle. Some embodiments of the mud flap 75 may have more than one hinge 65, while others may have no hinge at all, depending upon the size or customization of it. This hinge 65 opens to a certain angle, as determined by the length of a tab 115, and stops. Because of this hinge 65 and its folding or bending motion, the channels 60 of the mud flap 75 are opened. Keeping the mud flap 75 from being separated from the mounting bracket 15 are the tabs 115 that fit contiguously inside each channel of the mud flap hinge 65 and close this opening to outside elements. The tabs 115 extend from the hinged joint opposite the pivot point, and on the side facing the mounting bracket 15 when the mud flap 75 and mounting bracket 15 are together. On the opposite side of the joint, across from the tabs 115 are tab slots 120 that the tabs 115 slide in and out of freely. The hinge is made in different configurations, one of which uses the pliable characteristics of the material from which the invention is constructed as the pivot point closing the channels when the hinge is not being utilized.

Figure 10A:
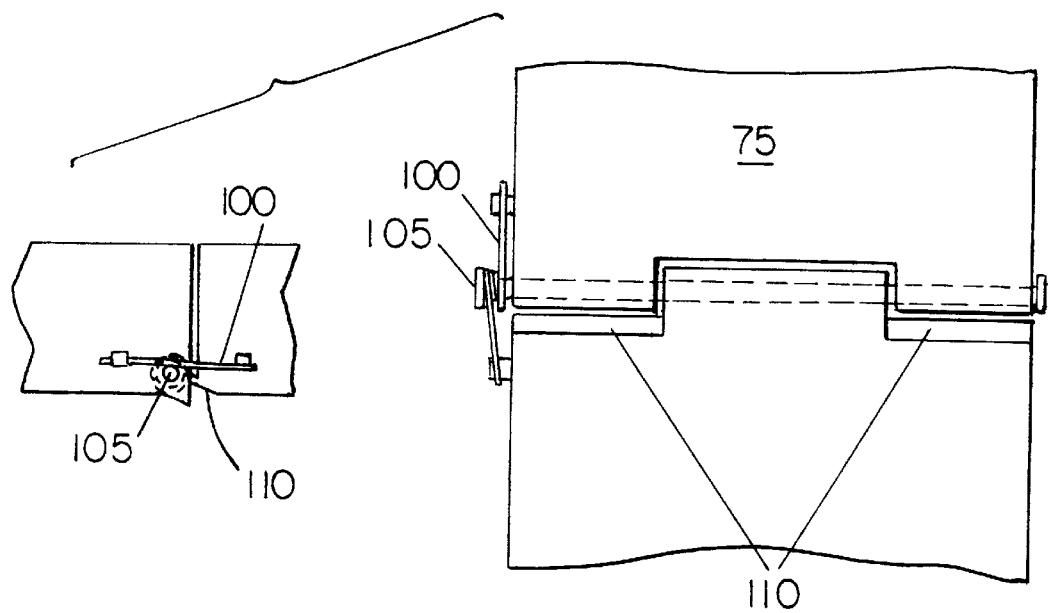
FIG. 10a depicts an exploded, side and perspective view of a hinge mechanism having a pivot on a pin.
Figure 10B:
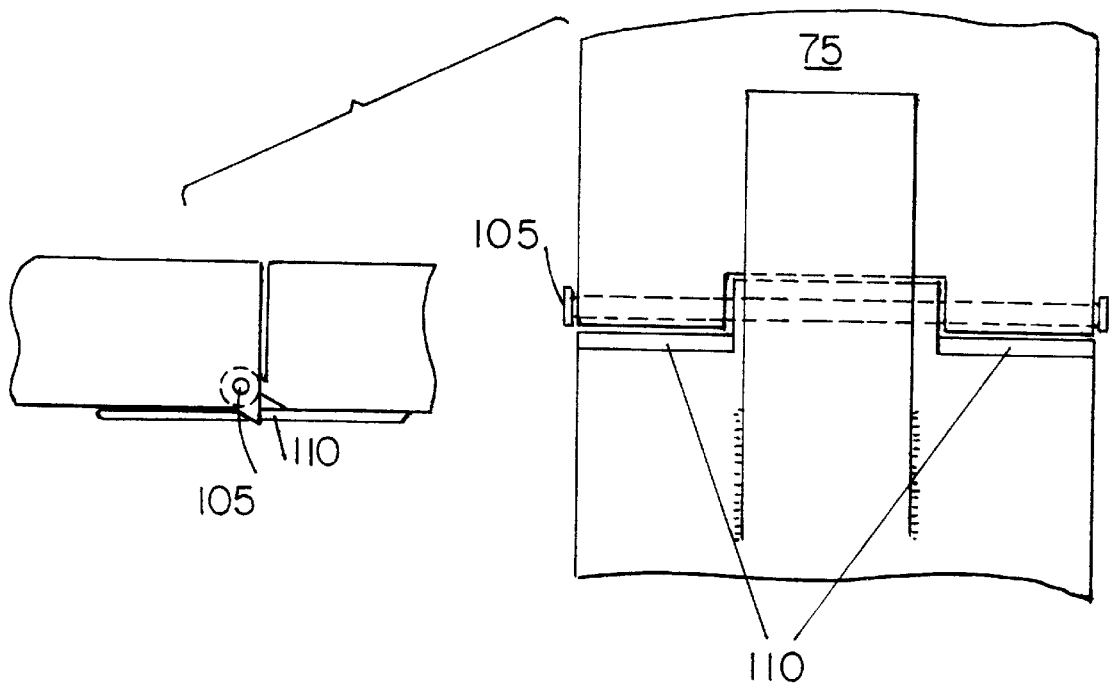
FIG. 10b depicts an exploded, side and perspective view of a hinge mechanism having an extension over the joint.

Moving now to FIG. 10a, the other pivot point is similar to a conventional hinge having a pivot pin 105, and is either spring loaded or an extension of the pliable construction material from the top or bottom pivoting side of the joint, as shown in FIG. 10b, and extends over the joint to the other side and closes the hinge when not being used.

The two parts, the mounting bracket 15 and mud flap 75 are, thus, coupled together. Once the bracket 15 is mounted securely to the vehicle, its tabs 20 are aligned with the mud flap's 75 corresponding channels 60 and simply slid together. Once the top of mud flap 75 is slid past the mounting body's 5 tabs 20, the flap 50 at the top of the mud flap 75 closes off the tops of the channels 60 folded over and the latch mechanism 55 is engaged, insuring the coupling of the two parts.

It is apparent that the present invention provides as a method and means for mounting and easily adjusting a splash guard assembly to a vehicle in order to prevent splash-back of dirt and debris into the field of a following vehicle or trailer, while protecting the body panels and rear quarter panels of the carrying vehicle. Furthermore, the instant invention may clearly be practiced in conjunction with any type of fender, i.e., cars, trucks, trailers, campers, vehicles in tow. While specific embodiments of the invention have been illustrated and described herein, these should not be construed as limitations on the scope of the invention, but rather an exemplification of the preferred embodiments thereof. Numerous variations are possible and will occur to those skilled in the art. It is therefore to be understood that the appended claims are intended to cover all such modifications and changes as fall within the true spirit and scope of the invention.

I claim:

1. An adjustable splash guard assembly useful for preventing debris splash-back, which comprises:

a) a mounting bracket having a means for semi-permanent attachment to a vehicle and further comprising a generally L-shaped mounting body having a certain top thickness and at least the same bottom thickness and an adjustment body having a plurality of angled tabs parallel to each other and an adjustment mechanism integrally formed from the bottom edge of said mounting body, said tabs in a generally perpendicular position in relation to said adjustment mechanism; and b) a mud flap having a means for attachment and a means for adjustment providing a functional combination with said mounting bracket, in operation, so that said mud flap is movable in relation to said mounting bracket.

2. The splash guard assembly as defined in claim 1, wherein said angled tabs are generally L-shaped and are defined by two planar surfaces at approximately a 90° angle to each other; the first planar surface being a rectangular planar surface defining the short side of the "L" and the second planar surface being a trapezoid-shaped planar surface defining the long side of the "L".

3. The splash guard assembly as defined in claim 1, wherein said tabs position and hold said mud flap the distance equivalent to the size of a common screw head from the mounting body.

4. The splash guard assembly as defined in claim 1, wherein said mud flap attachment means comprises channels and flexible panels that functionally interpose with said adjustment body.

5. The splash guard assembly as defined in claim 1, wherein said mud flap has vertical channels running approximately the length thereof, said channels having open tops for insertion and mounting of said mud flap onto said mounting bracket.

6. The splash guard assembly as defined in claim 1, wherein said mud flap adjustment means comprises indexed grooves or slots structurally and functionally corresponding to said adjustment body.

* * * * *